United States Patent [19]

Schwartz et al.

[11] Patent Number: 4,485,765

[45] Date of Patent: Dec. 4, 1984

[54] ANIMAL FEEDER

[76] Inventors: Harvey R. Schwartz; Samuel I. Grossman, both of 2423 Patricia Ave., Los Angeles, Calif. 90064

[21] Appl. No.: 422,305

[22] Filed: Sep. 23, 1982

[51] Int. Cl.³ ............................................. A01K 5/02
[52] U.S. Cl. ................................. 119/51.13; 119/51.5
[58] Field of Search ............. 119/51.11, 51.12, 51.13, 119/51.5, 52 B, 56 R, 52 AF, 53; 222/650, 144; 221/121, 122

[56] References Cited

U.S. PATENT DOCUMENTS

| 2,791,984 | 5/1957 | Frankin | 119/51.5 |
|---|---|---|---|
| 3,741,162 | 6/1973 | Lopez | 119/51.13 |
| 3,955,537 | 5/1976 | Yujiri | 119/51.13 |
| 4,000,719 | 1/1977 | Richards | 119/51.13 |
| 4,249,483 | 2/1981 | Sobky | 119/51.12 |
| 4,279,220 | 7/1981 | Kukurba | 119/56 R |
| 4,315,483 | 2/1982 | Scheidler | 119/51.11 |

Primary Examiner—Gene Mancene
Assistant Examiner—Kris R. Schulze

[57] ABSTRACT

An improved animal feeding and watering device comprising a timer controlled, sectioned, rotatable storage bin situated over a chute that channels animal food into a feeding bowl and a drinking water delivery system comprising a water storage tank and float controlled valve to maintain a constant supply of water.

4 Claims, 26 Drawing Figures

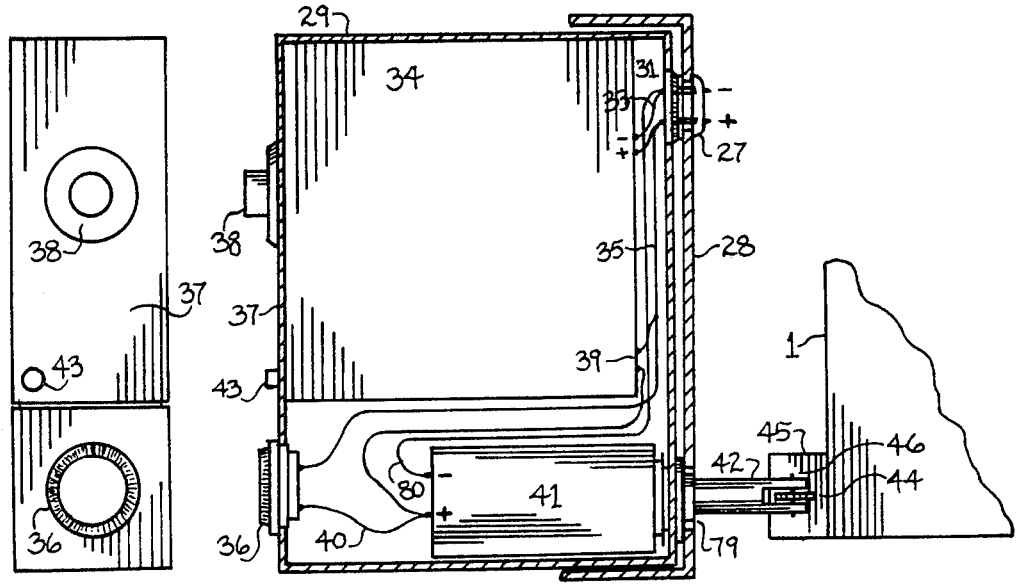
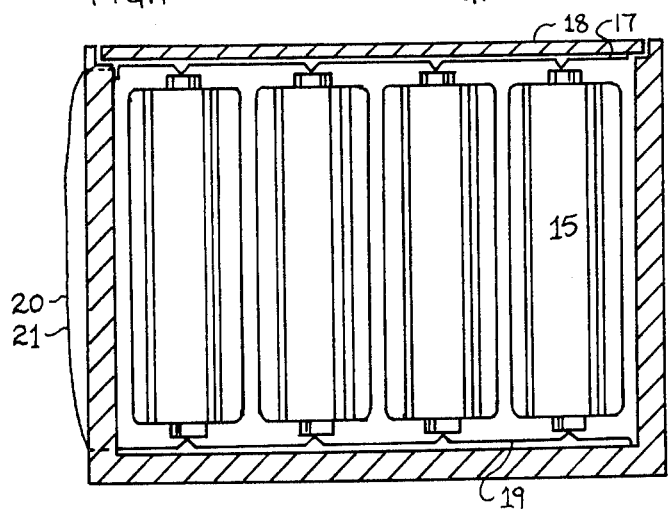
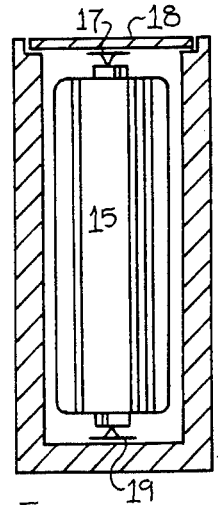
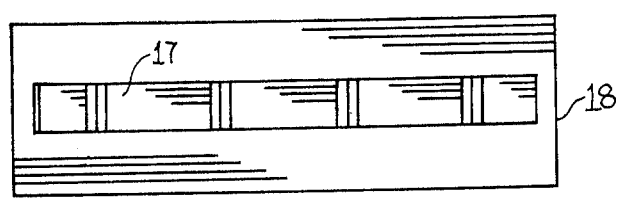
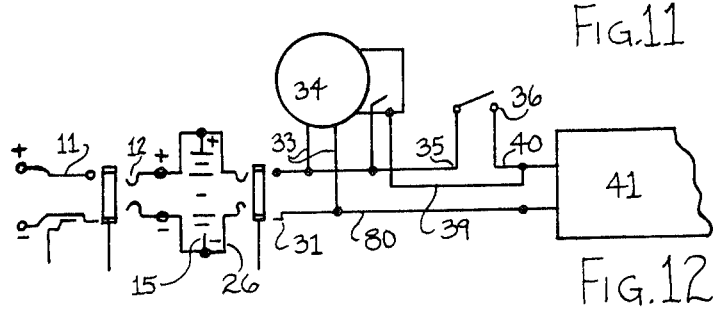
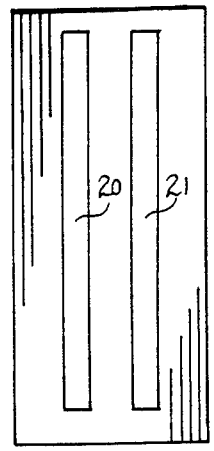

ANIMAL FEEDER

BACKGROUND OF THE INVENTION

Heretofore, devices for the automatic feeding of animals such as dogs or cats has been accomplished by means of electrically operated machines which necessitated the supply of electrical current in sufficient amounts to drive the food storage bins and delivery devices. My invention, by virtue of its governor controlled, spring powered motor and battery powered, low power consumption electronic timer, and low power solonoid release-stop arm, allows the automatic feeding of animals possible in areas without availability of A.C. current. This is especially important to breeders and vendors of animals whose cages and animal confinement areas are often outdoors or in barn-like structures without easy electrical access, as well as owners who normally keep their animals outdoors. The device can also operate from standard A.C. current by means of a transformer for those using the device in the home or in areas with access to A.C. current.

Heretofore, such automatic feeding devices have, in most cases only supplied automatic feeding for a maximum of five feedings. My invention, though incorporation of replacable carousels containing up to 16 food containing sections allows up to fifteen days of automatic feeding and allows multiple feedings per day as is necessary for the proper development of infant animals such as dog puppies.

Heretofore, some animal feeding devices have not allowed for the dispensing of precise amounts of food thereby allowing either underfeeding or over feeding. Such devices also make it impossible to include food additives such as vitamins, oils, and medicines to be ingested in precise amounts by the feeding animals. This device allows very precise amounts of food and additives to be despensed.

Heretofore, most automatic feeding devices did not supply drinking water at all, thereby necessitating the need for the animal's owner to manually supply water and therefore making the owner's absence for any extended period of time impossible. In those devices that did supply drinking water, the feeding device itself had only a limited capacity as stated in the previous paragraph. This device allows the owner to automatically feed their animals unattended for up to two weeks with a constant water supply under conditions of easy or non-existant access to electrical power and also provides an convenient way for despensing food and water at all times.

Heretofore, most automatic feeding devices allowed only the use of dry dog food commonly referred to as kibble. This device also allows use of the so-called moist dog food such as Gaines Burgers, Top Choice, etc. giving the animal's owner a much wider choice of commercially available animal food.

Further objects and advantages of this invention will become apparent from consideration of the drawings and ensuing description.

BRIEF DESCRIPTION OF DRAWINGS

FIG. 7 is a front view elevation of the timer/ solonoid compartment exterior.
FIG. 8 is a side view elevation of the timer/solonoid compartment interior.
FIG. 9 is a front view elevation of the battery compartment interior.
FIG. 10 is a side view elevation of the battery compartment interior.
FIG. 11 is a bottom view of battery compartment lid.
FIG. 12 is a wiring diagram of the electrical components.
FIG. 13 is a side view elevation of the battery compartment exterior.

DETAILED DESCRIPTION OF INVENTION

Figure 1:
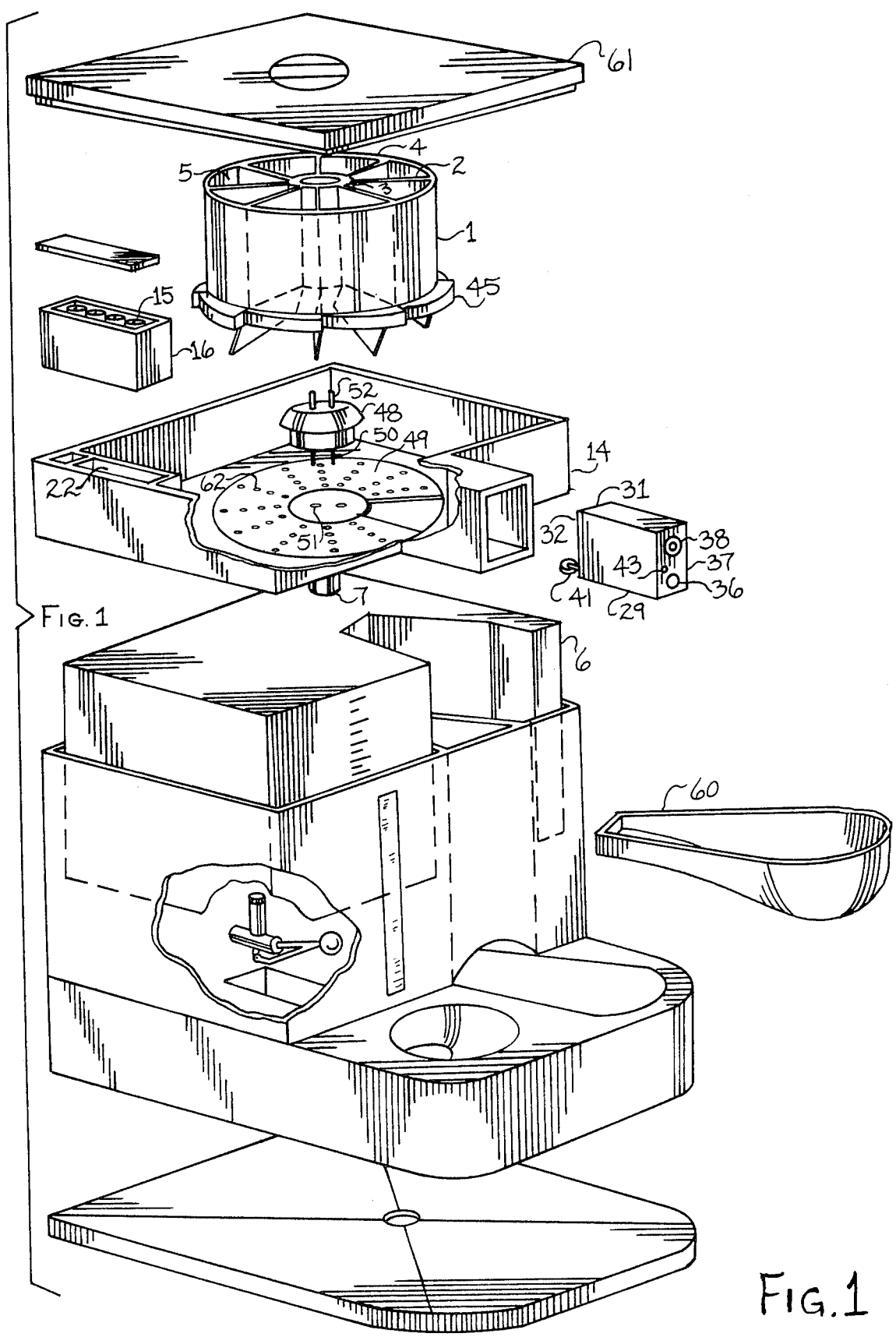
FIG. 1 is an exploded perspective of the invention.
Figure 2:
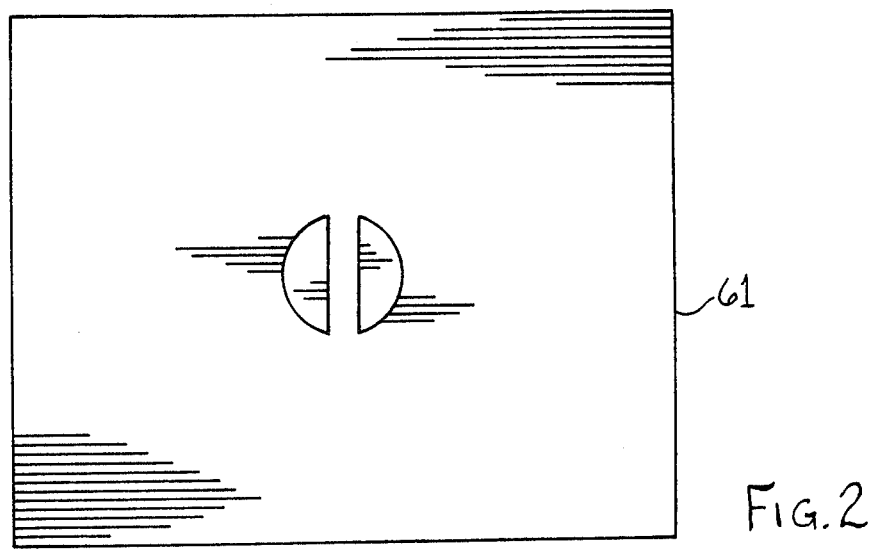
FIG. 2 is a top view of the cover or lid of the invention.
Figure 3:
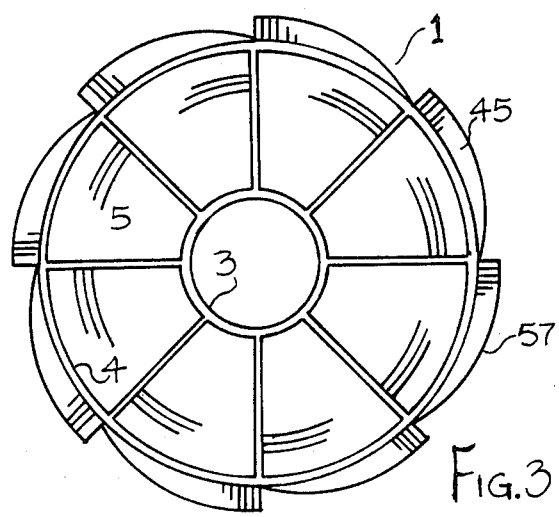
FIG. 3 is a top view of the 8 section carousel.
Figure 5:
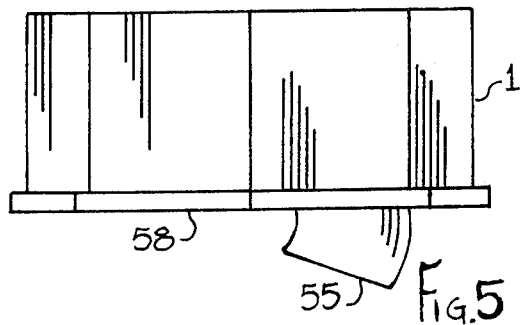
FIG. 5 is an elevation of the carousel.
Figure 4:
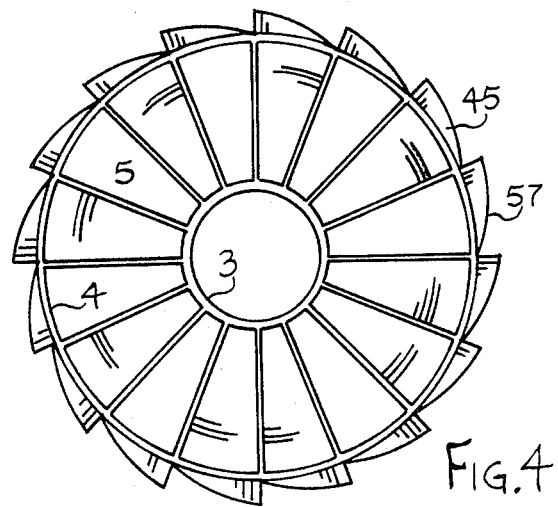
FIG. 4 is a top view of the 16 section carousel.
Figure 6:
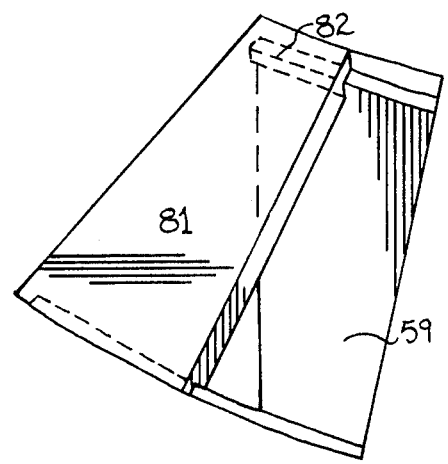
FIG. 6 is a detail of the opening size reducer to be used with 16 section carousel.
Figure 14:
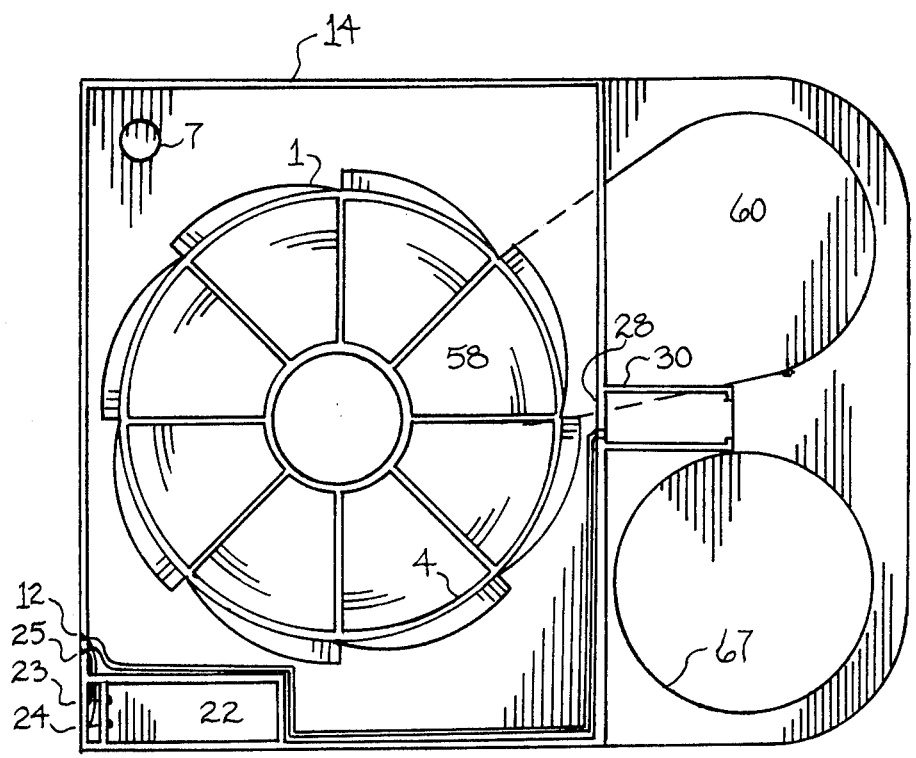
FIG. 14 is a top view plan of the appliance with carousel compartment housing.
Figure 15:
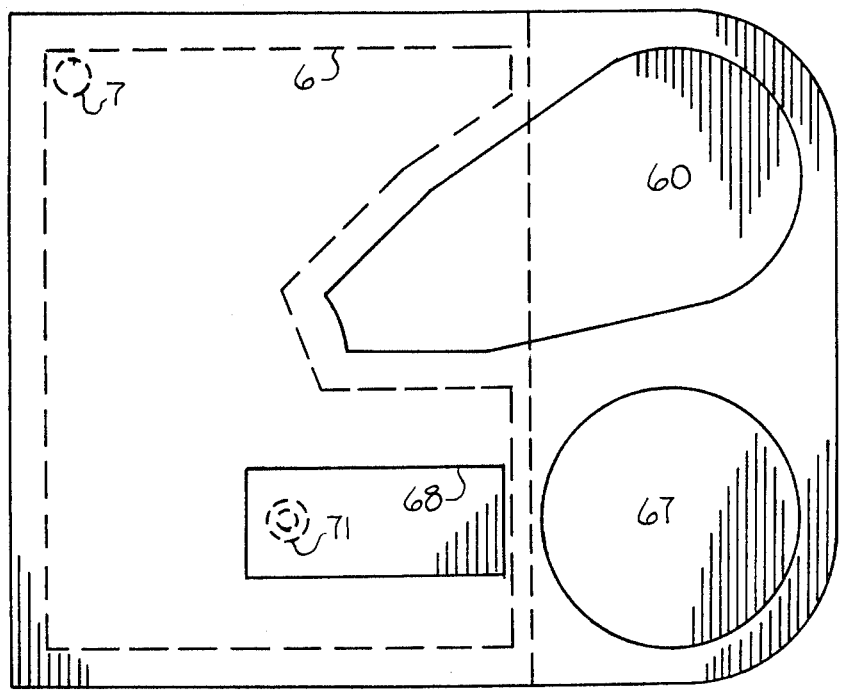
FIG. 15 is a top view plan of the appliance without carousel compartment housing.
Figure 16:
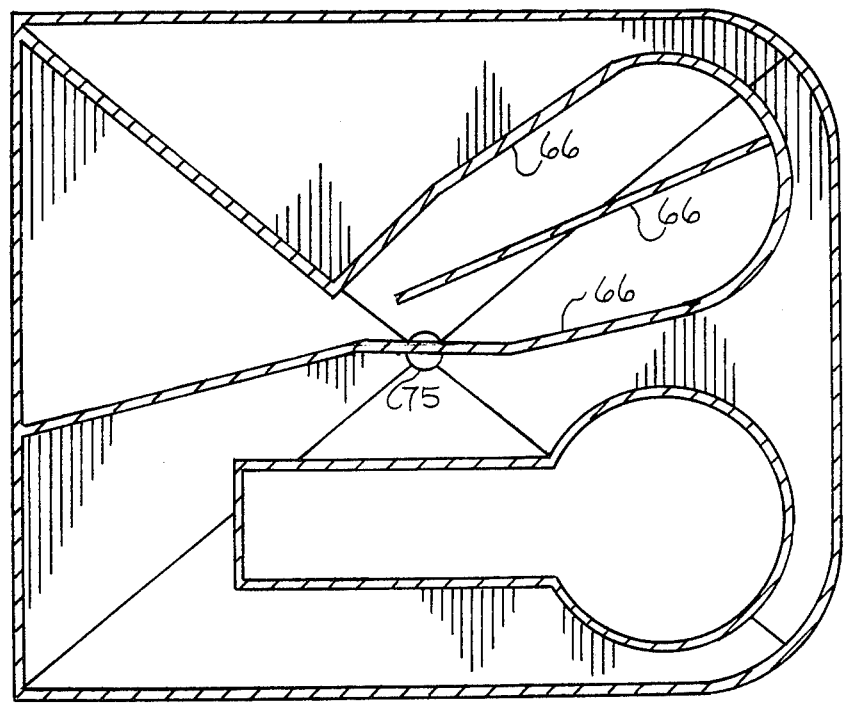
FIG. 16 is a top view plan of the base.
Figure 17:
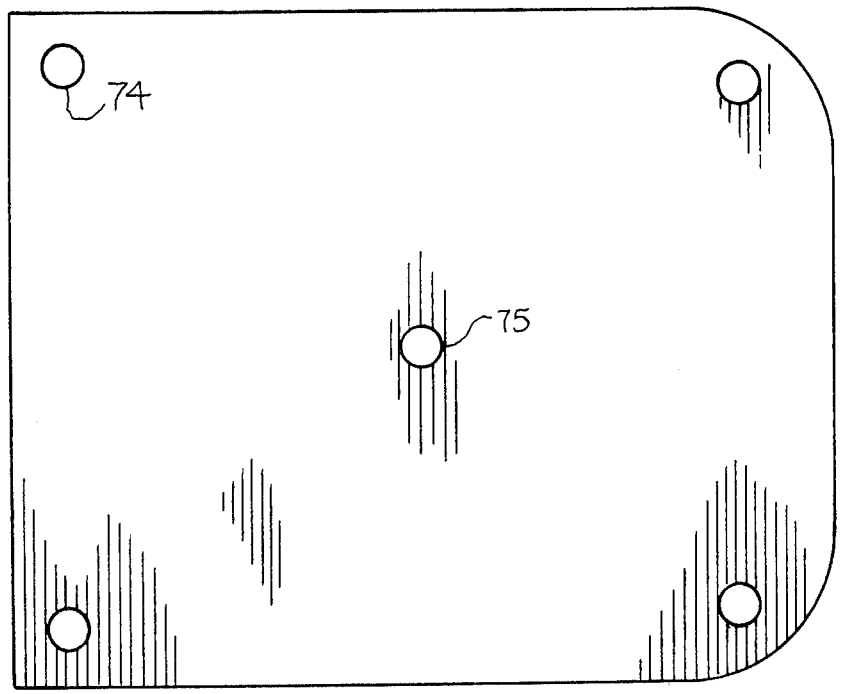
FIG. 17 is a bottom view of the base.
Figure 18:
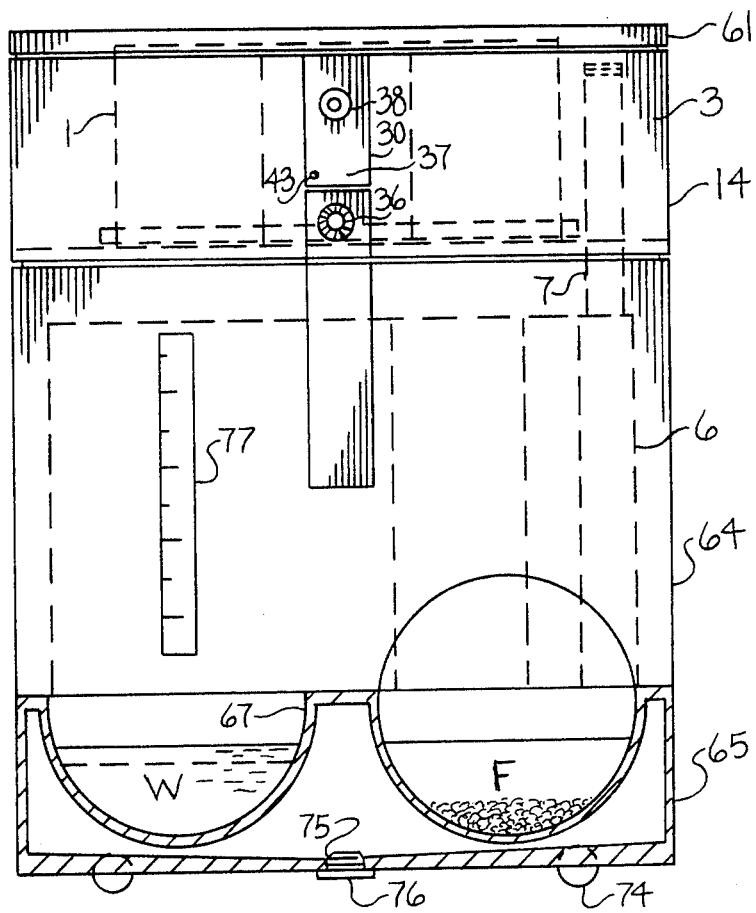
FIG. 18 is a front elevation of the appliance.
Figure 19:
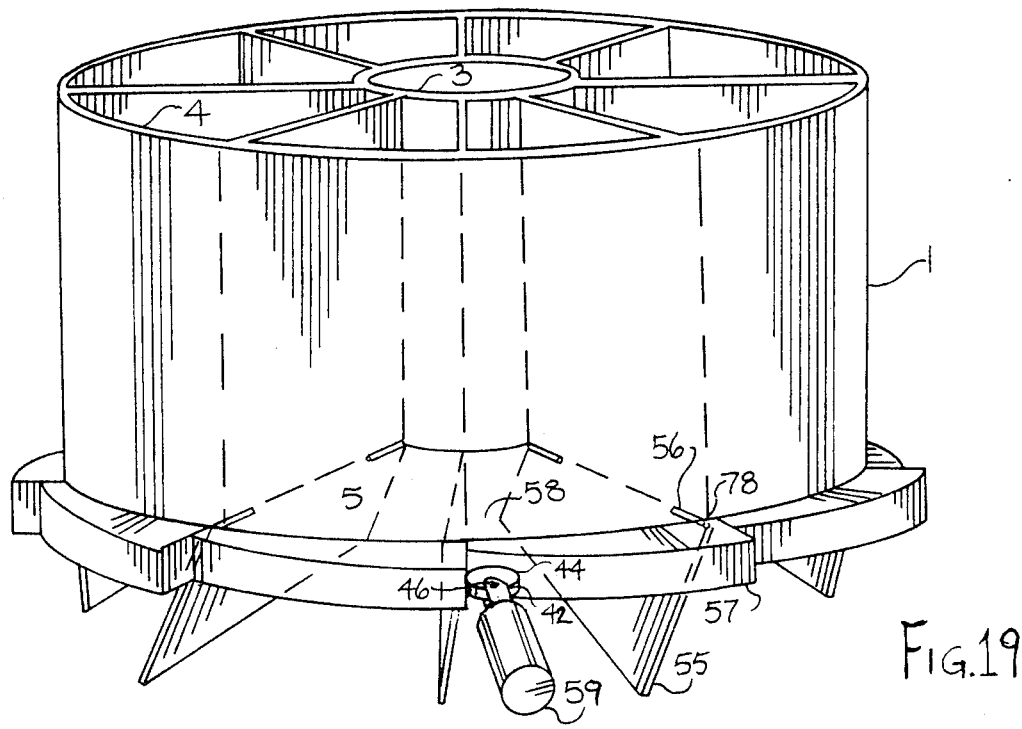
FIG. 19 is a detail of the carousel, food retaining doors and cogs.
Figure 20:
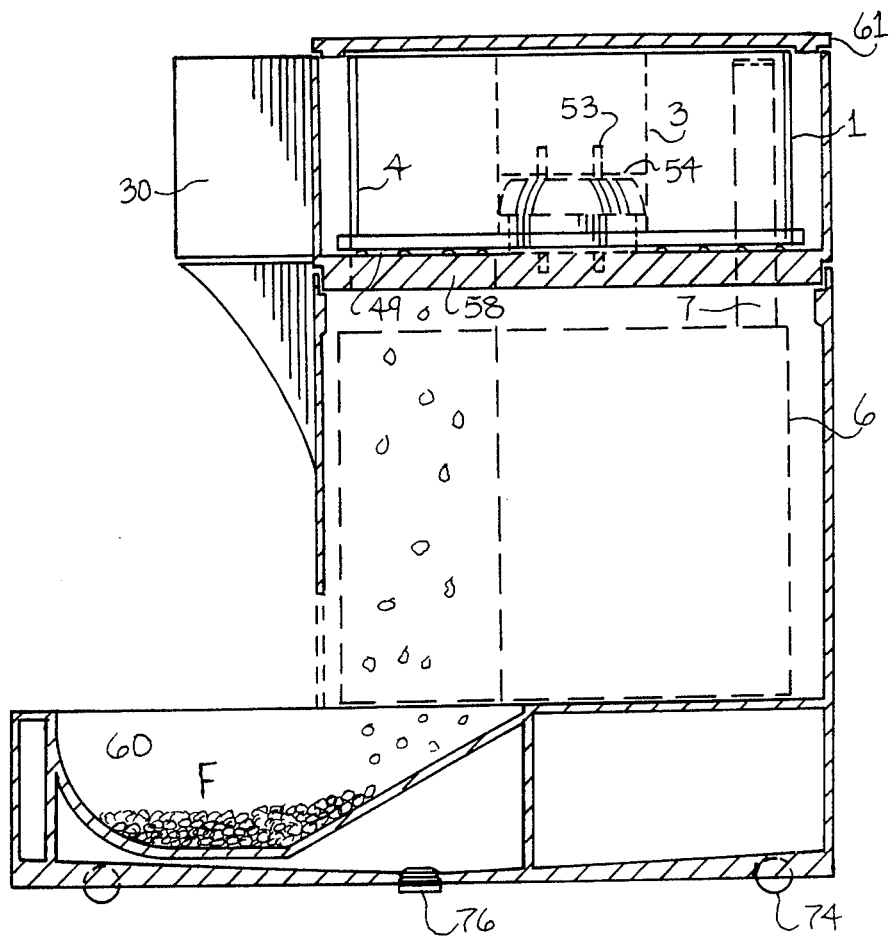
FIG. 20 is a right side elevation of the appliance.
Figure 21:
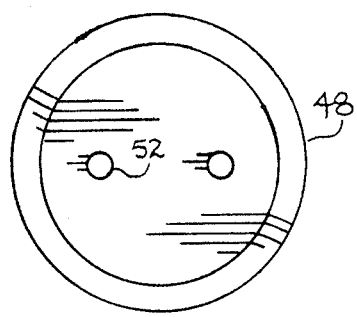
FIG. 21 is a top view of the spring motor housing.
Figure 22:
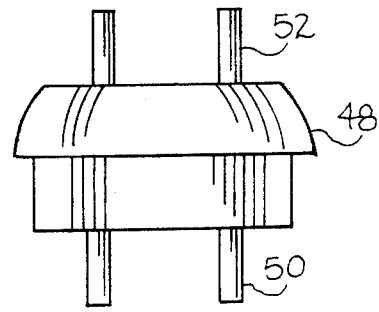
FIG. 22 is a side elevation of the spring motor housing.
Figure 23:
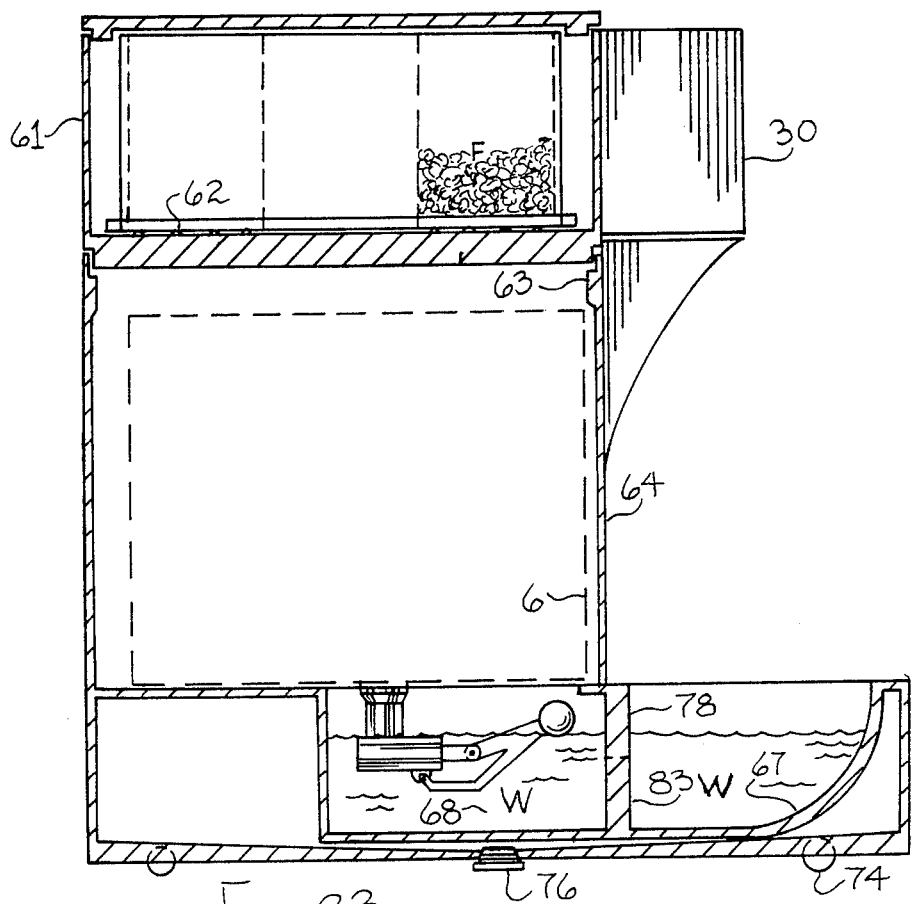
FIG. 23 is a left side elevation of the appliance.
Figure 24:
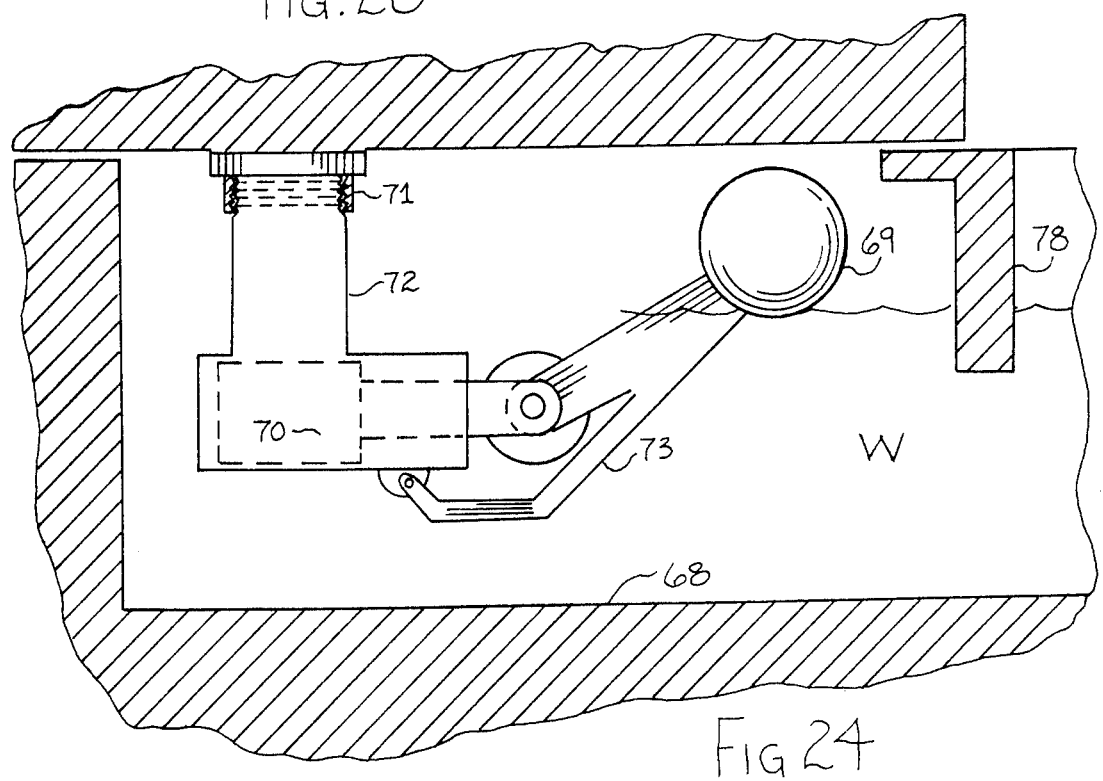
FIG. 24 is a detail of the float controlled valve assembly.
Figure 25:
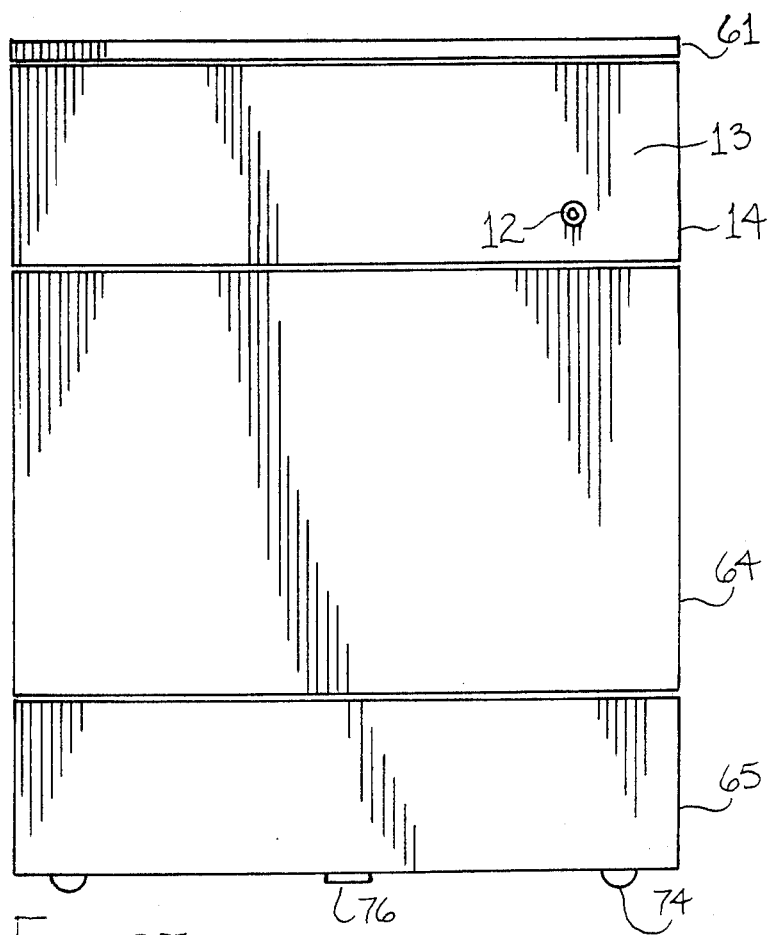
FIG. 25 is a back elevation of the appliance.
Figure 26:
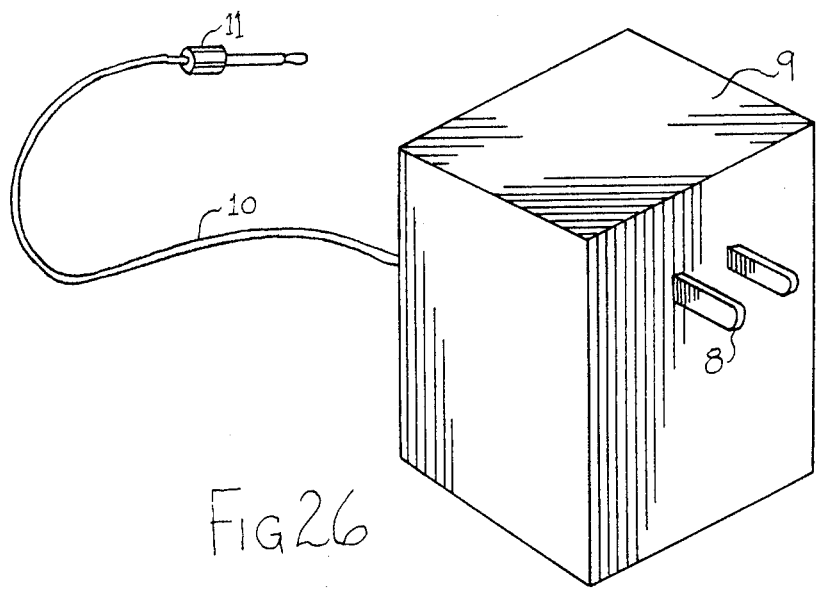
FIG. 26 is a detail of the A.C. plug and transformer assembly.

Food (F) is deposited into sections of food storage carousel (1) which consists of radial walls (2) eminating from a cylindrical inner hub (3) to a cylindrical outer wall (4) to form food storage compartments (5). Food retaining doors (55) act as a floor of the food storage compartments (5) and are attached to the inner hub (3) and outer wall (4) by means of hinge pins (56) set into hinge pin holes (78). When carousel (1) is placed in carousel housing (14), food retaining doors (55) are supported by friction reducing bumps (62) allowing easy rotation of carousel (1). Carousel housing (14) rests on lip (63) of the exterior support structure (64) which is mounted on base (65) and is covered by carousel housing cover (61). Molded into base (65) is water bowl (67) and reservoir (68). Number of possible feedings is determined by the use of either eight section food storage carousel (1) or sixteen section food storage carousel (1A). If sixteen section food storage carousel (1A) is used opening size reducer (81) is placed on opening reducer support lip (82) at opening (18) in carousel housing floor (49).

110 volt A.C. electric current is supplied through plug (8) to transformer (9) which converts current to 12 volt D.C. Current passes through wires (10) to miniature phono plug (11) which plugs into miniature phono socket (12) mounted into back exterior wall (13) of carousel housing (14). 12 volt D.C. current from batteries (15) such as Eveready E304116 housed in removable battery compartment (16) through metal battery connection pressure plate (17) which is embedded in battery compartment lid (18) and current from battery connection pressure plate (19) contact bowed metal pressure plates (20) and (21). When battery compartment (16) is inserted into battery compartment housing (22), pressure plates (20) and (21) contact bowed metal pressure plates (23) and (24). Current passes through wires (25) which are connected in parallel to incoming current from socket (12). In the event of A.C. power failure causing current from socket (12) to cease, current from the batteries continues to flow allowing the appliance to keep functioning. Current passes though wires (26) to timer/solonoid compartment power socket (27) which is mounted into the timer/solonoid compartment housing rear wall (28). When removable timer/solonoid compartment (29) is inserted into timer/solonoid compartment housing (30), plug (31) mounted in timer/solonoid compartment rear wall (32) contacts socket (27) allowing current to pass through wires (33) to power inputs of electronic timer/switch (34) such as those timers manufactured by Electromatic of Arlington Heights, Ill. and through wire (35) to manual feed timer override button (36) mounted in timer/solonoid compartment front wall (37). Solonoid shaft (42) protrudes through solonoid hole (79) in timer/solonoid compartment housing rear wall (28). Timing cycle is selected by turning timer knob (38) to desired interval.

When timing cycle is ON, current passes through electronic timer/switch (34) and wires (39) or when manual feed timer override button (36) is pressed current passes through wire (40) to solonoid (41) such as Deltrol MEB-16×2 causing solonoid shaft (42) to withdraw. Circuit is completed through wire (80). When current is flowing to timer (34), current indicator light (43) will be ON.

When solonoid shaft (42) withdraws, contact between friction reducing solonoid shaft wheel (44) and carousel positioning cog (45) is disconnected freeing food storage carousel (1) to rotate. Solonoid shaft wheel (44) is attached to solonoid shaft (42) by pin (46) through pin holes (47). Governor controlled spring motor (48) is mounted onto carousel housing floor (49) and held in position by means of spring motor housing positioning pins (50) which fit into holes (51). Food storage carousel's (1) cylindrical inner hub (3) fits over spring motor (48). Spring motor position pins (52) fit into holes (53) in horizontal positioning pin receptical wall (54). Winding spring motor (48) is accomplished by manually turning food storage carousel (1) clockwise until proper tension is achieved.

As freed food storage carousel (1) rotates, the one second timing cycle ends allowing solonoid shaft (42) to return. The friction reducing solonoid shaft wheel (44) rolls along the shank camming surface (57) of cog (45) stop end until it meets the next cog, causing food storage carousel (1) to stop, positioning food storage compartment (5) over food storage compartment shaped opening (58) in carousel housing floor (49) causing food retaining door (55) to fall open allowing food (F) to drop into chute (59). During the next cycle, the open food retaining door (55) is forced back up by the rounded edge of opening (58). Food (F) passes through chute (59) into removable food bowl (60) below from which the animal feeds. Food bowl (60) is supported and positioned by support walls (66).

Water (W) is supplied to removable water storage tank (6) through threaded hose attachable intake tube (7).

When the animal drinks from water bowl (67) causing the water level in reservoir (68) to drop, the downward motion of float (69) opens valve (70), attached to removable water storage tank (6) by threaded connection collar (71) and threaded water delivery tube (72) through linkage (73) allowing water (W) to flow into reservoir (68) until proper level is reached, raising float (69) and closing valve (70). Water flows to water bowl (67) from reservoir (68) through opening (83).

Access to float controlled valve assembly (69), (70) and (73) by animal is restricted by nose guard (78). Water storage tank is removed by lifting carousel housing (14) from exterior support structure (64) allowing access to water storage tank (6) which is lifted out for cleaning. Water level is determined by viewing water level through transparent water level indicator opening (77).

The entire appliance is mounted on casters (74) for easy movement. Threaded drain hole (75) is positioned in bottom of base (65) and plugged with threaded drain plug (76) to facilitate cleaning.

The entire device with the exception of the timer (34), solonoid (41), solonoid shaft (42), and electrical plugs, sockets, and wires ae constructed in molded plastic.

While the above description contains many specificities, these should not be construed as limitations on the scope of the inventions, but rather as an exemplification of one preferred embodiment thereof. Many other variations are possible, for example, a change of size to accommodate animals of the barnyard or zoo variety either larger or smaller is possible as well as changes in the exterior appearance of the device such as a cylindrical exterior superstructure with attractive facets. Accordingly, the scope of the invention should not be determined by the embodiment illustrated, but by the appended claims and their legal equivalents.

We claim:

1. A device for automatically dispensing pet food through a chute to a food bowl on a predetermined schedule comprising:

a housing comprising a base having a food dish compartment for holding said food bowl;

food delivery means communicating with said chute mounted on a platform above said base, said food delivery means comprising a carousel having a circular periphery, said carousel including wedge-shaped compartments having a curved outer periphery, each of the wedge-shaped compartments further comprising camming surfaces positioned along said curved outer periphery and an end stop at a forward edge of the camming surface, the bottom of each of the wedge-shaped compartments including a hinged door;

a wedge-shaped aperture in said platform; means to rotate said carousel in an advance direction;

indexing means for positioning each compartment over said aperture at a predetermined time in successive order comprising a timer-actuated solenoid fixidly attached to said housing, said solenoid comprising a timer and a shaft having at one end a friction reducing wheel, said shaft having a normally extended state and an actuated withdrawn state, whereby when the carousel rotates in its advance direction, said shaft is in its extended state and said wheel rides along a said camming surface until said wheel abutts against a said stop and whereby carousel motion is halted at a position wherein a compartment is superimposed above said aperture allowing said hinged door to drop, discharging the food from the compartment through the chute to the food bowl, and upon actuation of said shaft to its withdrawn state at said predetermined time, the wheel disengages from the end stop thus allowing the carousel to rotate to the next successive compartment.

2. A device as in claim 1 comprising a water receptical in said base and a float-controlled water supply valve connected to a water supply to maintain a predetermined level of drinking water in said water receptical.

3. A device as in claim 1 wherein said rotating means comprises spring means for rotating said carousel.

4. A device as in claim 1 further comprising means for supplying current from an alternating current source to said solenoid and a 12 volt direct current source for supplying power to said solenoid, whereby should said alternating current be interrupted, said direct current source is utilized.

* * * * *